DEVICE FOR PRODUCTION OF UNIFORM CIRCLE GRADUATIONS

Filed May 29, 1951 2 Sheets-Sheet 1

Inventors:
Walter Bauersfeld
Eugen Bernhardt

Dec. 22, 1953 W. BAUERSFELD ET AL 2,663,082

DEVICE FOR PRODUCTION OF UNIFORM CIRCLE GRADUATIONS

Filed May 29, 1951 2 Sheets-Sheet 2

Inventors:

Walther Bauersfeld
Eugen Bernhardt

Patented Dec. 22, 1953 2,663,082

UNITED STATES PATENT OFFICE 2,663,082

DEVICE FOR PRODUCTION OF UNIFORM CIRCLE GRADUATIONS

Walther Bauersfeld and Eugen Bernhardt, Heidenheim (Brenz), Wurttemberg, Germany, assignors to Zeiss-Opton Optische Werke Oberkochen G. m. b. H., Oberkochen, Germany Application May 29, 1951, Serial No. 228,792

6 Claims. (Cl. 33—19)

Figure 1:
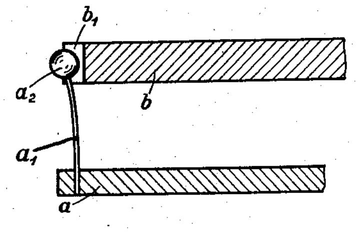

The invention concerns a device for production of uniform circle graduations of high precision. The fundamental idea of the invention is based upon the consideration that one can in the transfer of a graduation extensively diminish the existing irregularities of the intervals if it is possible, in each new setting of the disc to be divided over against the ruling mechanism, to bring about an average value of several or of all the intervals incorporated in the present graduation. This thought can be realized in the following manner. One employs two graduation discs arranged coaxial to one another, of which the one is firmly connected with the disc to be graduated and the other is so connected with one or several ruling mechanisms that relative rotation about an axis perpendicular to the plane of the disc is prevented and of which at least one is equipped at its periphery with a number, depending on the number of graduation intervals, of equally distributed springy elements, which can be brought into engagement with corresponding elements, recesses or lugs of the second disc. In such an arrangement, every time the two graduation discs engage one another, automatically an equalization of all the springy elements occurs, since in each of the possible mutual positions of the two discs all of the springy elements simultaneously contribute to bring about the mutual position of the discs and thereby effect an average.

At first it appears convenient, in such a device, to connect the two graduation discs with one another by means of a common axis, so that the equalization of the individual intervals can take place only in the direction of the circle circumference. One achieves, however, in horizontally placed graduation discs an even greater equalization, if one mounts the one graduation disc stationary in radial direction, and the second graduation disc practically freely movable in all radial directions against the actions of the springy elements, so that after engagement of the two graduation discs neither friction nor other forces act upon the movable graduation disc. For this any of the known means can be used, for example mounting upon freely movable balls between two parallel planes perpendicular to the axis, or the like. It is self-evident, that the free movability is necessary only within very narrow limits, namely only as far as the occurring interval differences make an equalization necessary, that beyond that, however, the movable graduation disc must be guided so that after each shift forward the correct engagement of the two graduation discs is assured. In this arrangement the radially freely movable graduation disc possesses no proper axis, since its position in radial direction is determined exclusively by the springy elements.

The development of the springy elements can take place in highly varying forms. Any desired spring action can be used for this purpose. For example flexure springs, torsion springs, as well as other elastic means or a composite spring action can be employed. The only importance is that the springy elements of a graduation disc are distributed over the circumference with a greatest possible uniformity, and possess uniformly equal dimensions and equal elastic properties. Basically both graduation discs can be equipped with springy elements; the construction however proceeds more simply, if only one of the two discs carries springy elements. The other disc then is provided with corresponding recesses or lugs which coact with the springy elements of the first disc.

Numerous possibilities present themselves for construction of the two graduation discs and the arrangement of the springy elements. For example one can develop the one graduation disc as a worm wheel, which however in contrast to to the known circle graduating machines does not coact with a single worm, but with a plurality of worms uniformly distributed over the circumference, which are all so mounted on the second graduation disc, that they under spring pressure engage the common worm wheel and thereby are held in their axial direction likewise by springy members. In this arrangement one can also employ the worms at the same time to shift forward for the following graduation mark; however one must take care, that at each shifting the angle of rotation for all the worms is the same. It is clear, that the equalization of the interval errors incorporated in the device is the better, the greater the number of springy elements chosen. Since the installation of numerous springily mounted worms represents a large expenditure it is recommended to employ simple springy elements, as for example springy rods, or the windings of a coil spring, or the like, and so connect them with the graduation discs, that these can be brought into and out of engagement in simple manner through a mutual axial displacement. If one strives for the greatest possible equalization, one will make the number of springy elements equal to the number of graduation intervals to be produced, or equal to a whole multiple thereof, ever in accordance with how many springy elements coact with the second graduation disc for each graduation mark. With lesser demands for precision, it can also suffice to manage with a smaller number of springy elements; however, in order that for all graduation intervals there be possible an engagement of the two graduation discs, it is necessary that the number of springy elements is contained without remainder in the number of graduation intervals.

In joining together the two graduation discs, friction forces naturally arise between the springy elements and their contact surfaces, which result in damaging wear or can affect the free equalization of the elastic forces. It can therefore be expedient to interpose rollers between the springy elements and their countersurfaces, so that the joining together of the graduation discs proceeds practically without gliding friction. Finally it is important that the precision of the graduation to be produced is not affected also by an eventually remaining wobble error of the movable graduation disc. It is to be recommended therefore to place the plane of the graduation to be produced at least approximately in the plane in which the contact of the springy elements takes place after joining together of the two graduation discs.

The further technical details of a device in accordance with the invention can be executed in optional known manner. One can carry out by hand the four successive procedures required for each graduation mark, namely moving apart of the two graduation discs, shifting forward the movable graduation disc for the next graduation mark, joining together the two graduation discs, drawing of the line by the ruling mechanism; but with known means without further ado the whole can be fashioned into an automatically working machine. One can utilize hereby the experiences already gathered with circle graduating machines, as e. g. to execute bearings and guides as free as possible of lost motion, to keep away from the machine all shocks, vibrations and temperature influences etc.

Figure 2:
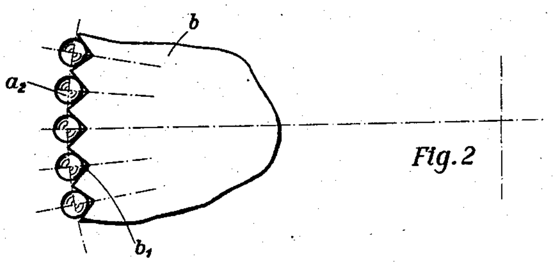
Figure 5:
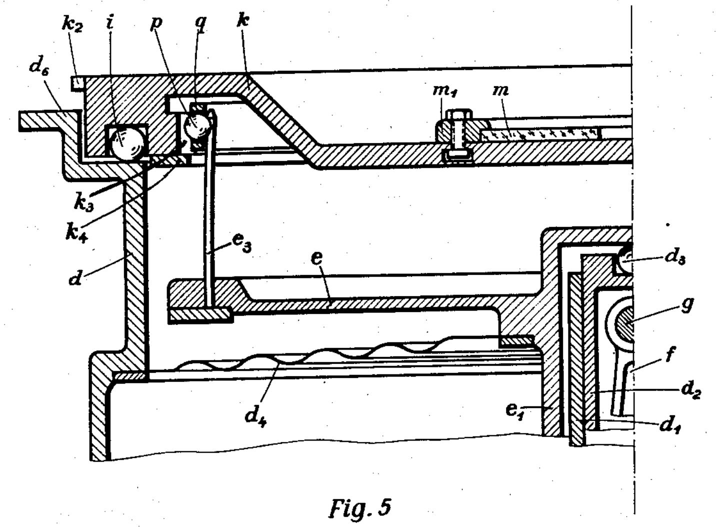
Figures 3, 4:
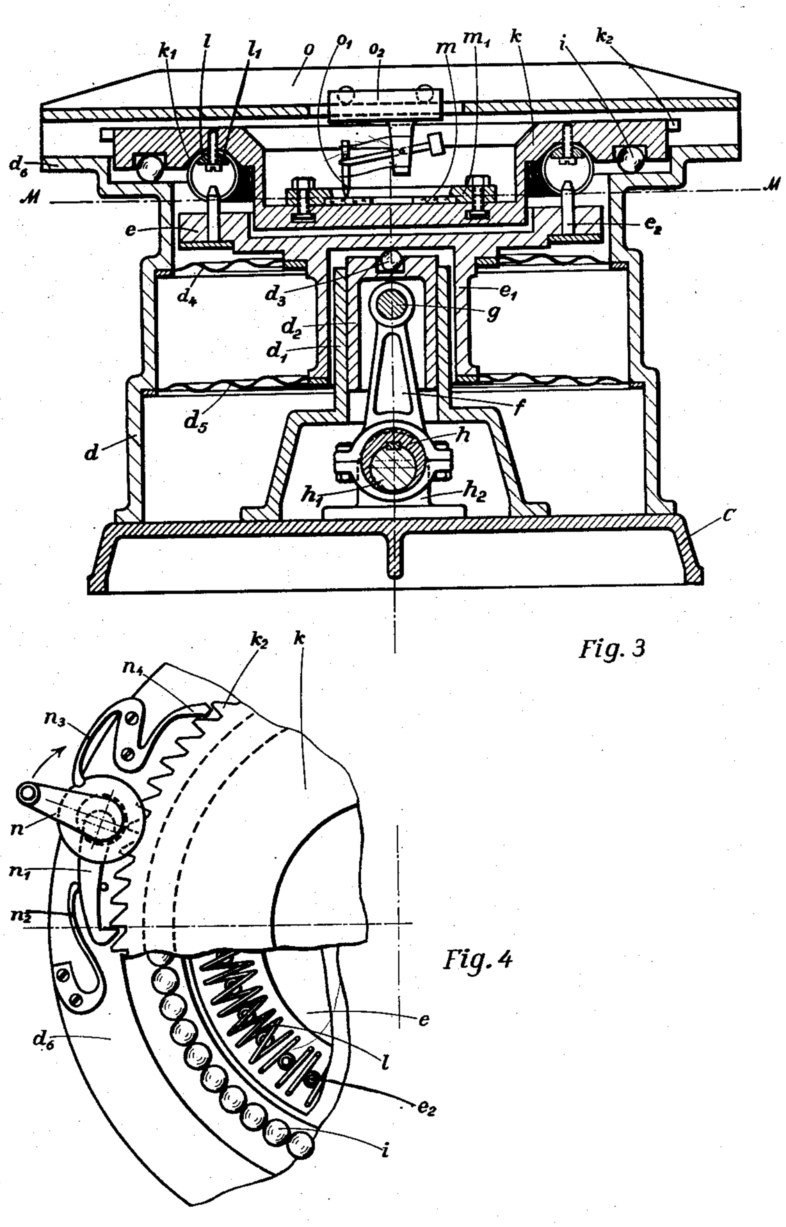

The invention is illustrated in the accompanying drawing by two schematic sketches, as well as by two exemplary embodiments. Figs. 1 and 2 elucidate through vertical section and a ground plan sketch the fundamental idea of the invention. Figs. 3 and 4 show in a perpendicular section through the axis and a ground plane section an embodiment of the invention in which the individual turns of a circularly bent coil spring serve as springy elements. Fig. 5 shows in a vertical section through the axis the essential parts of another embodiment, whose springy elements are formed of steel needles and in which the gliding friction is eliminated by interposition of ball bearings. In both examples of embodiment for simplicity's sake it is assumed that all movements to be executed are carried out by hand; the supplementation into an automatically operating machine offers no difficulties to the expert. Details unessential for the invention are only indicated, or omitted if generally known.

In the two schematic figures, Figs. 1 and 2, $a$ designates the one and $b$ the second of the two graduation discs coacting with one another. The disc $a$ carries, uniformly distributed at its circumference, firmly set in, springy rods $a_1$, each of which is provided at the upper end with a ball $a_2$. The disc $b$ possesses at its rim notches $b_1$, into which, when the two discs assume towards one another the depicted working position, the balls $a_2$ enter, whereby the rods $a_1$ are somewhat bent aside outwards. The number of notches $b_1$ is equal to the number of rods $a_1$. The two graduation discs can therefore be brought into just as many positions in reference to one another as there are present rods as well as notches. If one connects one of the graduation discs with the disc to be graduated and the other graduation disc with a ruling mechanism, then one obtains, in consequence of the equalization of the springy rods, the possibility of producing a graduation in which the position of each individual line results as the mean of the total intervals of the two graduation discs. It is immaterial which of the two graduation discs is moved for the shifting forward to the next position; it is important only that one of the discs retains unchanged its position in circumferential direction, and that the other graduation disc, under the influence of the springy rods, can freely adjust itself.

In the exemplary embodiment of the invention represented in Figs. 3 and 4 the lower disc possesses fixed shoulders and is precisely guided in radial direction i. e. allowing movement only in axial direction, while the upper disc carries the springy elements and for equalization of the same is mounted freely movable in its plane. Upon a base plate $c$ rests a cylindrical mounting body $d$, which in its interior possesses a guide box $d_1$, likewise fastened to the base plate $c$. In the guide box $d_1$ glides a cylinder $d_2$ which carries above on the axis, in a plane perpendicular thereto, a steel ball $d_3$. Upon this steel ball $d_3$ is supported, with a plane likewise perpendicular to the axis, a disc $e$, which represents one of the two graduation discs of the device. On its under side this disc $e$ possesses a cylindrical sleeve $e_1$, which with some play incloses the guide box $d_1$ and is firmly connected with the mounting body $d$ by means of two membrane discs $d_4$ and $d_5$. The membrane discs $d_4$ and $d_5$ however permit a movement of the disc $e$ only in axial direction sufficient for engagement. The disc $e$ carries at its rim, uniformly distributed over the circumference, firmly set in pins $e_2$, whose conical tips extend only a little beyond the surface of the disc. The pins $e_2$ have uniform dimensions; their number is equal to the number of intervals of the graduation to be produced. The disc $e$ with aid of the cylinder $d_2$ and the steel ball $d_3$ can be lowered and raised by a small amount by means of a connecting bar $f$, whose upper pivot $g$ is bedded in the guide cylinder $d_2$ and whose lower pivot is formed by an eccentric $h$, which is firmly wedged on a shaft $h_1$. The shaft $h_1$ is mounted on the base plate $c$ with aid of bearings $h_2$ and carries outside of the mounting body $d$ a crank to be operated by hand (not shown in the drawing), which makes it possible to turn the shaft $h_1$ in each case by 180° and therewith lower or raise the disc $e$. Above the disc $e$, the mounting body $d$ carries, with aid of a carefully executed ball bearing $i$, a further disc $k$, which constitutes the second graduation disc of the device. It possesses on its under side a cutout $k_1$ trapezium shaped in cross section, into which, filling the entire extent, is placed a precisely wound coil spring $l$, and screwed tight with aid of clamping plates $l_1$. The number of turns of this coil spring $l$ is equal to double the number of pins $e_2$ in the disc $e$, so that therefore, when the two discs $k$ and $e$ (as represented in the drawing) stand engaged with one another, each pin $e_2$ presses in between two turns of the spring $l$. The disc $k$, by virtue of the ball bearing $i$, is mounted practically freely movable in horizontal direction, so that a complete equalization of the elastic forces results throughout the entire extent. The disc $k$ is secured against unintended greater movements by an overlapping rim $d_6$ of the mounting body $d$. The central portion of the disc $k$ is somewhat recessed, and the recess serves for receiving a disc $m$ to be graduated, which can be fastened there with aid of a clamping ring $m_1$. The surface of the disc $m$ to be divided thereby lies in the plane MM, in which contact between the springy elements and the corresponding elements occurs. On the outer rim the disc $k$ possesses, corresponding in number to the number of graduation intervals, teeth $k_2$, with the aid of which the disc $k$ is shifted forward after every operation cycle. For this purpose there is mounted on the rim $d_6$ of the mounting body $d$ a small hand crank $n$, which carries eccentric to the crank axis a pawl $n_1$. A spring $n_2$ provides for engagement of the pawl $n_1$ with the teeth $k_2$. At each turn of the crank $n$ in the direction indicated in the drawing, the graduation disc $k$ is shifted forward by a tooth. The position reached thereby is secured by a catch spring $n_3$ coacting with the crank $n$. A further spring $n_4$ prevents an unintended further turning of the disc $k$ while activating the crank $n$. The whole shifting mechanism permits as much free play of the disc $k$ as is required for the uninfluenced equalization of the elastic forces, so that the disc $k$ can freely adjust itself in each working position. Finally on the rim $d_6$ of the mounting body $d$ is supported a bridge $o$, to be thought of as firmly screwed to the rim $d_6$. The bridge $o$ constitutes the carrier of the ruling mechanism which can be executed in optional manner and is indicated in the drawing only by a graver $o_1$ mounted on a guide carriage $o_2$.

The operation of the device should be clear from the description. Starting with the position shown in the drawing, for the first graduation, through turning of the shaft $h_1$ by 180°, the lower graduation disc $e$ is lowered so far that the pins $e_2$ get out of the range of the coil spring $l$. Then by a complete turn of the crank $n$ the upper graduation disc $k$ is advanced by a tooth of the tooth division $k_2$ and subsequently through a further turn of the shaft $h_1$ by 180° the lower graduation disc $e$ is again brought into engagement with the coil spring $l$. Thereby the upper graduation disc $k$ automatically sets itself to the mean value of all the intervals of the two graduation discs and the graduation mark can be drawn with the graver $o_1$. This procedure is repeated for each graduation mark.

In the second exemplary embodiment of the invention (Fig. 5), in contrast to the first example, the springy elements are connected with the lower graduation disc, while the upper graduation disc possesses fixed notches. For the rest the over-all construction is the same. Identical parts in the two examples are therefore provided with the same reference letter. The lower graduation disc $e$ here carries at its periphery firmly set in steel needles $e_3$, which are somewhat pointed at their upper end. The upper graduation disc $k$ possesses at the periphery an inside gearing and forms therewith notches $k_3$ in which balls $p$ are located. A ring $k_4$ screwed to the disc $k$ prevents the balls $p$ from falling out below. The securing of their position sideways results from a cage ring $q$ which curves around all the balls $p$, but which however permits the free engagement of the steel needles $e_3$ with the gap between the balls $p$. If, after adjustment of the upper graduation disc $k$ is effected, the lower graduation disc $e$ is raised, then the steel needles $e_3$ strike between the balls $p$, contacting and rolling the same upwards to the end of the stroke, so that in spite of the arising lateral deflection of the steel needles $e_3$, no gliding friction arises on the same. The drawing represents the position of the lower disc $e$ with the needles $e_3$ and the balls $p$ in the highest position. Here also therefore the upper disc $k$ can freely adjust itself under the action of the springy needles $e_3$, so that at each graduation mark again a mean value of all intervals of the graduation discs must be formed. The working procedure of this device is completely covered with that of the first exemplary embodiment of the invention.

We claim:

1. In an apparatus for producing uniform circle graduations, a mounting body, at least one ruling pen mechanism fitted to this body and two graduation discs arranged on this body coaxially to each other, one of said graduation discs being adapted to be firmly connected with a disc to be graduated, and the other said graduation disc being slidably mounted on said mounting body to move axially of itself with reference to said body and to said one graduation disc, at least one of said graduation discs being provided near its periphery with a number of equally distributed springy elements, and the other said graduation disc being provided with corresponding elements adapted to engage with said springy elements, and means for bringing into and out of engagement said springy elements with said corresponding elements.

2. In an apparatus according to claim 1, one of said graduation discs being mounted to be freely movable radially of itself against the actions of said springy elements, and the other said disc being fixedly mounted radially of itself.

3. In an apparatus according to claim 1, a ball bearing supporting one of said graduation discs on said mounting body, and the other said disc being fixedly mounted radially of said mounting body.

4. In an apparatus according to claim 1, said means for bringing into and out of engagement said springy elements with said corresponding elements comprising means effecting a relative axial displacement of said graduation discs.

5. In an apparatus according to claim 1, said means for bringing into and out of engagement said springy elements with said corresponding elements comprising means effecting a relative axial displacement of said graduation discs and containing rollers interposed between said springy elements and said corresponding elements for diminishing friction during engagement.

6. In an apparatus according to claim 1, the upper plane of the uniform circle graduation to be produced lying approximately in the plane in which contact engagement of said springy elements with said corresponding elements occurs.

WALTHER BAUERSFELD.
EUGEN BERNHARDT.

References Cited in the file of this patent

UNITED STATES PATENTS

| Number | Name | Date |
|---|---|---|
| 339,922 | Perkins | Apr. 13, 1886 |
| 1,894,976 | Brower | Jan. 24, 1933 |
| 1,945,586 | Arni | Feb. 6, 1934 |

FOREIGN PATENTS

| Number | Country | Date |
|---|---|---|
| 58,501 | Austria | Apr. 10, 1913 |